(No Model.)
W. G. ECKSTEIN.
SHUTTER.
No. 306,816. Patented Oct. 21, 1884.
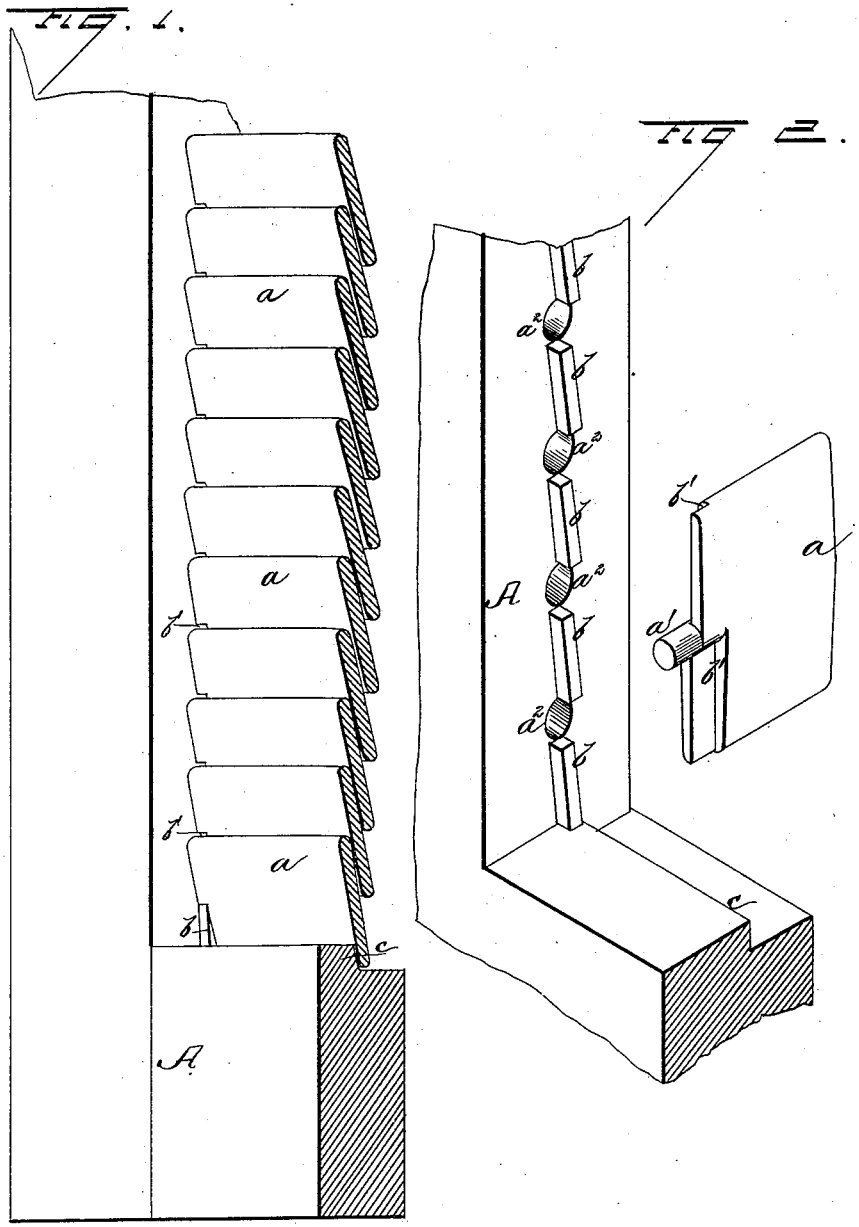

UNITED STATES PATENT OFFICE.

WILLIAM G. ECKSTEIN, OF CHICAGO, ILLINOIS.

SHUTTER.

SPECIFICATION forming part of Letters Patent No. 306,816, dated October 21, 1884.

Application filed April 21, 1884. (No model.)

*To all whom it may concern:*

Be it known that I, WILLIAM G. ECKSTEIN, a citizen of the United States, residing at Chicago, in the county of Cook and State of Illinois, have invented certain new and useful Improvements in Shutters, of which the following is a specification, to wit:

This invention relates to an improvement in shutters; and it consists in the peculiar construction of the same, whereby the joints of the slats and frame are closed and made to exclude the weather, substantially as will be hereinafter more fully described and claimed.

In order to enable others skilled in the art to which my invention appertains to make and use the same, I will now proceed to describe its construction and operation, referring to the accompanying drawings, in which—

Figure 1 is a perspective view of a portion of a shutter, and Fig. 2 a similar view of a slat and part of the frame separated to more clearly show their construction.

A represents the frame of a window-shutter, having pivoted slats $a\ a$ turning upon journals $a'$, entering holes $a^2$ of the frame, in the usual way.

Between the holes $a^2$ of the side bars of the frame A are formed upon it or secured thereto a series of short tongues, $b\ b$, which are preferably placed upon a slight incline, as in Fig. 2. The slats $a\ a$ are upon their ends formed with two recesses, $b'$—one upon each side or face of the slat. These recesses are cut about half through the slat, and extend from the journal $a'$ to the edge of the slat in either direction, as shown in the drawings. When these slats are placed in the frame and closed, as in Fig. 1, they close tightly against the tongues $b\ b$, the recessed ends of the slats allowing them to close fully, and the space usually formed between their ends and the frame is completely closed by the tongues and the wind and weather excluded. To further protect the shutter from rain or snow, I form the end rails of the frame with shoulders $c$, against which the slats close, as in Fig. 1.

Having thus fully described my invention, what I claim as new, and desire to secure by Letters Patent, is—

1. In a window-shutter, the frame having a series of short tongues between the holes for receiving the slats, in combination with the slats formed with recessed ends adapted to receive and clasp the tongues, substantially as and for the purpose set forth.

2. The frame A, having holes $a^2$ and inclined tongues $b$, in combination with the slats $a$, having journals or pins $a'$ and recesses $b'$, substantially as and for the purpose set forth.

In testimony whereof I affix my signature in presence of two witnesses.

WILLIAM G. ECKSTEIN.

Witnesses:
W. C. McARTHUR,
CHAS. KRESSMANN.